July 12, 1960 L. SVEN-ERIK WIKLUNDH ET AL 2,944,924
METHOD OF CLEANING STORAGE AND TRANSPORT TANKS, ESPECIALLY
SHIPS' TANKS, FROM OIL, FAT, WAX AND THE LIKE
Filed Nov. 5, 1957
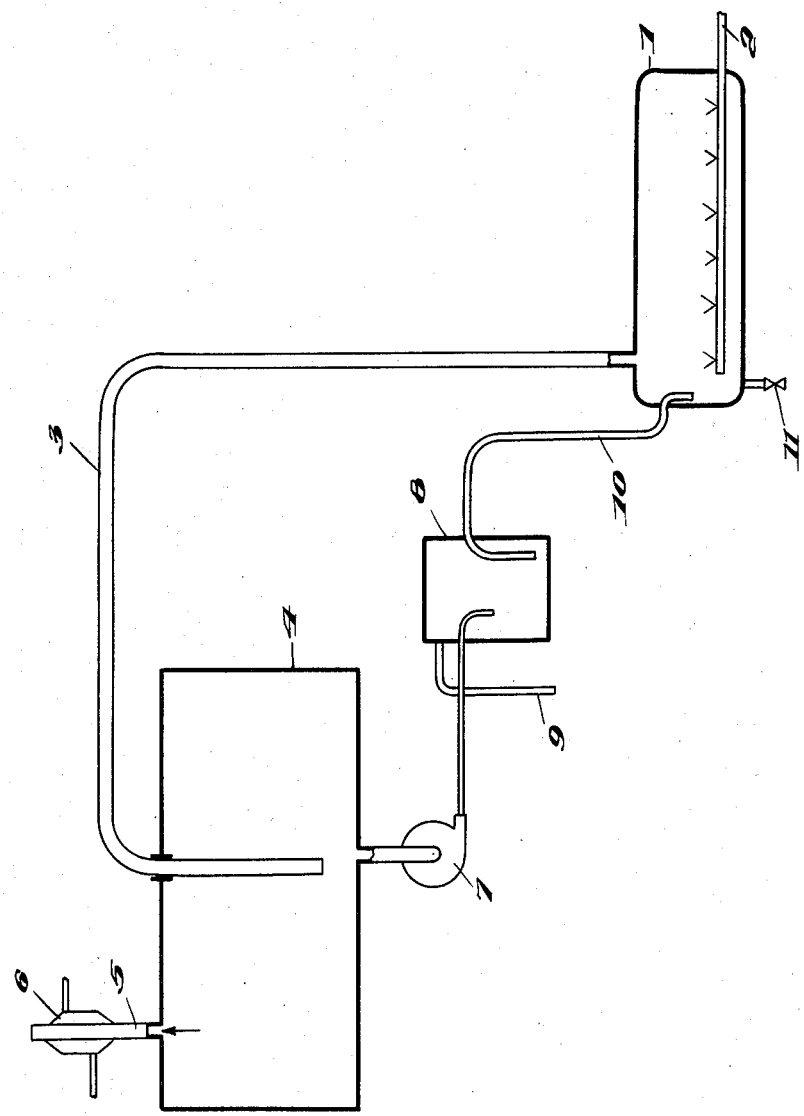

United States Patent Office 2,944,924
Patented July 12, 1960

2,944,924

METHOD OF CLEANING STORAGE AND TRANSPORT TANKS, ESPECIALLY SHIPS' TANKS, FROM OIL, FAT, WAX AND THE LIKE

Leif Sven-Erik Wiklundh, Karlstad, and Sven Helmer Persson, and Kurt Anders Holm, Edsviken, Skoghall, all of Sweden, assignors to Uddeholms Aktiebolag, Skoghall, Sweden, a Swedish company Filed Nov. 5, 1957, Ser. No. 694,646

4 Claims. (Cl. 134—11)

The ever increasing use of oils, such as obtained from petroleum as well as from vegetable and animal oils, has involved considerable problems of cleaning tanks which are used for storing and transporting the products referred to. The need for cleaning arises on several different occasions, for instance, when the tank is to be used for other goods or another quality of goods than before, or it is to be inspected or repaired. Also an accumulation of sludge continued in course of time may bring on a need for cleaning.

The methods used for the time being are as a rule based upon a combination of steaming and water flushing followed by a mechanical removal by means of shovelling, sweeping and scraping. These methods may be combined with the use of emulsifying agents or liquid solvents. As a rule a cleaning operation performed in this manner is very laborious and time consuming, which especially is to a great economical disadvantage as regards tankers but also when stationary storage tanks, tank cars, etc. are concerned. The difficulty of separating the contaminations removed and accompanying water also involves problems hard to overcome when it comes to taking care of the waste products.

It has previously been proposed to clean oil tanks by blowing in a vapor of a solvent at the top of the tank. This known method, however, may result in an unsatisfactory cleaning and has as far as is known not been commonly used. Thus the quantity of solvent vapor blown in per time unit must of course not be too small as otherwise there is a risk for the condensation substantially taking place on limited portions of the tank wall, while other portions are hardly reached by the solvent vapor and thus become insufficiently cleaned. In order to vaporize the amount of solvent required a special volatilization equipment with large heat areas is needed which increases the cost of the plant.

According to the present invention it has been found that the solution of the problem of introducing in a simple manner large quantities of solvent vapor into a tank and having some guarantee of an effective cleaning of one and all surfaces lies in the feature that the solvent is vaporized by a direct blowing in of steam, in doing which the vapor of the solvent must be heavier than air, and that the vapor mixture thus formed is introduced at the bottom of the tank to be cleaned. Due to the fact that the vapor mixture is heavier than air it settles on the bottom of the tank and forms a rather well defined interface towards the air. By blowing in a larger amount of vapor mixture than what is condensing on the walls of the tanks, the interface between the vapor mixture and the air will be moved upwards during a simultaneous heating of the tank while the air is forced out through an opening at the top of the tank until the whole tank is filled with the vapor mixture. On this account a good condensation is obtained at every point of the tank, and an effective cleaning is thus gained.

The method is based upon the use of low-viscosity and comparatively volatile solvents, preferably boiling within the temperature interval 60–130° C. (140–265° F.) at atmospheric pressure and characterized by a vapor density greater than 1 in relation to air. Especially adaptable for use in employing this method are solvents non-mixable with water, of all others chlorinated solvents such as trichlorethylene, perchlorethylene, ethylene chloride, monochlorobenzene, etc. but also other solvent than chlorinated ones may be used, such as benzene, toluene, benzine etc.

The solvent condensate on the wall surfaces of the tank flows towards the bottom and then dissolves oils, fats, waxes, etc. being on the surfaces. The solution of contaminations in the solvent is continuously withdrawn from the bottom of the tank according as it is formed, after which it is conducted to a device for separating water and solid contaminations. Finally the dissolved contaminations may be separated from the solvent by distillation, steam being either present or absent.

When all soluble contaminations have been removed from the tank, the vapor mixture supply is interrupted. The content of solvent in the tank is thereupon removed in a suitable way, for instance, by any of the two following methods.

According to the one method the solvent vapor together with liquid solvent possibly remaining on the surfaces is driven out of the tank by means of steam and is condensed outside the tank. The driving off of the solvent from the sludge layer normally occurring on the bottom of the tank is facilitated if the bottom during the driving off is covered with a water layer which is brought to boil by supplying steam. When the tank is completely ridded of solvent it is cooled down by water being injected, preferably in the state of water mist, or by ventilating, or by a combined water injection and ventilating.

The other method of removing solvent vapor from the tank is carried out in such a way that the tank is cooled down by means of water injection in the manner as previously stated. Condensed solvent is withdrawn from the tank together with the cooling water and is separated from this in an appropriate device. The bottom is covered with a water layer which is brought to boil by injecting steam at the same time as the tank is ventilated. When the tank is free from solvent, the steam supply is cut off and the water withdrawn.

The method which should be chosen for removal of the solvent vapor from the tank depends on local conditions and is often determined by the value attached to a short cleaning time compared to small losses of solvent.

The present invention is of special importance when cleaning very large tanks requiring large quantities of solvents for the cleaning. Due to the fact that steam is used for vaporizing the solvent, such steam usually being at hand in plants of this kind with no need for extra installations to be made for the purpose, the large quantities of solvent required can easily and quickly be vaporized. The heat of evaporation of the steam and solvent vapor mixture will become greater than that of the solvent vapor alone, which means that a smaller steam volume is required for heating the tank than if a pure solvent vapor was to be used.

The heat capacity together with the heat emission is normally sufficient for assuring a quantity of solvent large enough to be condensed so as to render it possible to remove the soluble contaminations completely in one operation. In cases of cleaning which are especially ticklish it may become necessary to repeat the procedure after cooling down the tank in order to achieve a full effect.

The invention will be described more in detail in the following with reference to the attached drawing showing a complete cleaning plant for performing the method according to the invention.

In the drawing 1 denotes a vaporization vessel containing a suitable solvent, such as trichloroethylene, which in the following description of the drawing will be more briefly designated "tri." Steam is blown into the vaporization vessel through a pipe 2. In doing so the solvent is vaporized and the azeotropic mixture of the tri vapor and steam is introduced through the conduit 3 into the oil tank which is to be cleaned. As the conduit 3 ends near the bottom of the tank 4 the vapor mixture blown in settles on the bottom of the tank and the interface between the vapor mixture and the stagnant air above is gradually moved upwards as a greater quantity of vapor mixture is blown in than what corresponds to the vapor quantity condensing on the bottom and walls of the tank. The air is driven out through a pipe 5 connected to the top of the tank, said pipe being provided with a condenser 6 for separating any tri vapor which might accompany the air.

The mixture of tri vapor and steam will condense on the cooler walls of the tank 4 and the tri condensed will dissolve the oil on said walls and flow down to the bottom of the tank. The mixture of oily tri and water is pumped by means of a pump 7 to a water trap 8 where the water is removed through a discharge pipe 9 while the solvent with the oil dissolved is conducted through the conduit 10 to the vaporization vessel 1 and the resulting mixture of oil and contaminants is withdrawn through the bottom draining member 11.

The loss of solvent in the apparatus described theoretically does not exceed what is escaping in a vaporous state together with the air driven out, and this loss, as stated, can be kept down by causing the air to pass a condenser. The loss can be still more reduced by the air in the system being driven out more or less completely by means of steam before starting the cleaning operation. In blowing in tri-water vapor, the gas passing through the pipe 5 and the condenser 6 will then consist of steam containing rather small amounts of tri vapor and possibly air, depending on how thoroughly the preparatory driving out of air has been carried out. Steam as well as tri vapor then condenses in the condenser and flows back to the tank practically completely so that the small amount of air which escapes to the atmosphere brings with it an amount of tri which can be practically neglected.

The preparatory forcing out of the air in the tank by means of steam also involves that effect that the walls of the tanks are heated, which often may be to advantage as then not such a large quantity of the triwater vapor mixture is needed for the very heating which is important in those cases when the heat capacity and the heat emission of the tank are so large that condensing of the mixture of solvent vapor and steam when the tank is cold takes place to a greater extent than what corresponds to the cleaning requirement on the occasion.

*Example*

An upright, cylindrical, stationary tank for fuel oil No. 5, having a diameter of 12 m. (39 ft.), a height of 10 m. (33 ft.) and a volume of 1100 m.$^3$ (39,000 cu. ft.) was emptied of oil as completely as possible by pumping. On the bottom of the tank a layer approximately 5 cm. (2 in.) thick of a smeary compound remained, containing oil, wax, water, rust etc. A similar layer, having a thickness which was varying with the level, was also adhering to the walls. An azeotropic mixture of trichlorethylene vapor and steam was introduced into the tank by means of a pipe connected to a manhole cover adjacent the bottom of the tank. A well defined interface was formed between the vapor layer on the bottom of the tank and the air above. The vapor was generated in a 2 m.$^3$ (70 cu. ft.) container, which was half filled with trichlorethylene and provided with pipes for the direct blowing in of steam, and supplied to the tank with such a velocity that the interface rose 1–2 m. (3–6 ft.) per hour. The condensate formed was returned together with dissolved and dispersed contaminations by way of a dirt filter and a water trap to the vapor generator where the contaminations were concentrated. The contents in the vapor generator were diluted with a thin fuel oil and transferred to a storage tank in pace with the oil accumulating in the generator. When the vapor had reached the ceiling of the tank, the condensate coming out from the tank was free from oil. The tank was cooled off by the injection of water and ventilated in the way as previously described. The further condensed and free-from-oil chlorethylene was returned to the storage for pure solvent. The oil-trichlorethylene mixture obtained was thereupon distilled by steam in the 2 m.$^3$ (70 cu. ft.) container previously used as a generator, which for the purpose was provided with a condenser. The trichlorethylene driven off was conducted to the storage for pure solvent and the oil, which after the distillation only was containing traces of trichlorethylene, was gathered up after water dispersed was caused to settle on the bottom and drawn off.

The example illustrated here is only one of many possible and suitable embodiments of the invention. Thus the solvent may be substituted by other, previously mentioned solvents, the arrangement as regards apparatuses of the devices for generating and introducing solvent vapor and water, and for dirt separation, solvent recovery etc. may be varied in a multiplicity of different ways and so on without departing from the concept of the invention.

We claim:

1. The method of internally cleaning a substantially empty oil tank which comprises the steps of introducing steam into a vaporizer containing a solvent to vaporize the same and to form a gaseous mixture of steam and solvent vapor, said solvent in its gaseous state being heavier than air, introducing said gaseous mixture into the tank near its bottom, removing from the tank the condensate and the oil dissolved therein, separating water from said condensate, returning the remaining condensate, and the oil dissolved therein to said vaporizer, vaporizing the solvent component of said condensate, and removing the oil from said vaporizer.

2. The method defined in claim 1 which includes the steps of discharging the air in said tank from the upper portion thereof as said gaseous mixture is introduced into said tank, and condensing the solvent vapor from the air.

3. The method defined in claim 1 wherein the solvent consists of at least one chlorinated hydrocarbon.

4. The method defined in claim 3 wherein the solvent consists of trichlorethylene.

References Cited in the file of this patent

UNITED STATES PATENTS

| 1,722,211 | Guardino | July 23, 1929 |
|---|---|---|
| 1,891,592 | Fitzgerald | Dec. 20, 1932 |
| 2,065,462 | Olsson | Dec. 22, 1936 |
| 2,153,577 | Levine | Apr. 11, 1939 |